United States Patent [19]

Waddill

[11] 4,423,170
[45] Dec. 27, 1983

[54] ONE COMPONENT WATER REDUCED EPOXY ADHESIVES

[75] Inventor: Harold G. Waddill, Austin, Tex.

[73] Assignee: Texaco Inc., White Plains, N.Y.

[21] Appl. No.: 434,684

[22] Filed: Oct. 15, 1982

[51] Int. Cl.³ .................. C08L 63/00; C08L 63/02; C08G 59/50

[52] U.S. Cl. ..................... 523/417; 528/98; 528/111; 528/407; 523/414

[58] Field of Search ............... 523/414, 417; 528/111, 528/98, 407

[56] References Cited

U.S. PATENT DOCUMENTS

| | | | |
|---|---|---|---|
| 3,496,138 | 2/1970 | Sellers et al. | 528/111 |
| 3,609,121 | 9/1971 | Lohse et al. | 528/111 |
| 3,645,969 | 2/1972 | Harvey | 528/111 |
| 4,167,498 | 9/1979 | Waddill | 523/414 |
| 4,316,003 | 2/1982 | Dante et al. | 528/111 |

*Primary Examiner*—Earl A. Nielsen
*Attorney, Agent, or Firm*—Robert A. Kulason; Jack H. Park; Richard A. Morgan

[57] ABSTRACT

A water based epoxy resin composition is disclosed. The epoxy resin is useful as an adhesive.

The composition comprises a modified diepoxide with a latent curative in aqueous medium. The diepoxide is modified by partial reaction with a polyoxyalkyleneamine containing variable amounts of ethylene oxide.

13 Claims, No Drawings

ONE COMPONENT WATER REDUCED EPOXY ADHESIVES

BACKGROUND OF THE INVENTION

1. Field of the Invention

This invention relates to the field of water based epoxy resins. It particularly relates to one component water based epoxy resins which are useful as adhesives.

2. Prior Art

Water based epoxy resins are known in the art. Prior art water based epoxy resins generally utilize an emulsifier and an organic solvent in their formulation. The presence of organic solvent provides the problem of volatile solvent release. Therefore, those skilled in the art have sought to provide a water based epoxy resin which is free of the difficulties of using large amounts of organic solvents. In U.S. Pat. No. 3,998,771 a process is disclosed whereby a carboxylic acid is reacted with a primary amine to form an amide. This amide is then reacted in excess with an epoxy resin and the product water dispersed and further reacted with enough epoxy resin to stoichiometrically cure the resin.

A water reducible coating system is described in U.S. Pat. No. 4,167,498 which is prepared by combining a bisphenol A epoxy resin with a polyamide prepared from fatty acids and an amino propyl derivative of a polyoxyalkylene polyamine.

U.S. Pat. No. 4,308,183 describes a water borne coating employing a bisphenol A epoxy resin produced by addition of an ethoxylated nonylphenol and a long chain organic phosphatide.

U.S. Pat. No. 4,315,044 describes a self-emulsifying epoxy resin employing the diglycidyl ether of bisphenol A, bisphenol A and the diglycidyl ehter of polyoxyalkylene glycol in aqueous medium.

Many other patents describe water reduced epoxy adhesive systems. The use of a polyoxyalkyleneamine to modify the epoxy resin and solubilize it in aqueous medium is heretofore unknown in the art.

It is well known in the art that there is a need for a water reduced adhesive which minimizes the use of hazardous or polluting solvents while producing a bond of considerable strength.

SUMMARY OF THE INVENTION

The invention comprises a two part water reduced epoxy resin composition, which parts are combined to form stable emulsions and may be stored for prolonged periods prior to use. The first part, hereinafter referred to as Part A or base resin, is a diepoxide comprising the condensation product of epichlorohydrin with an aromatic or aliphatic diol, which diepoxide is partially reacted with a polyoxyalkyleneamine of molecular weight of about 900 to about 2500. The second part, hereinafter referred to as Part B comprises a latent curative. When cured with heat the system forms a strong adhesive bond.

DESCRIPTION OF THE PREFERRED EMBODIMENTS

Part A of the two part composition of the present invention comprises an epoxy base resin. The preferred epoxy base resin is a condensation product of epichlorohydrin with a modified aromatic or aliphatic diol, for example, ethylene glycol, diethylene glycol, glycerol, diglycerol, catechol, resorcinol, a di(hydroxyphenyl) methane, a di(hydroxyphenyl) ethane, a di(hydroxyphenyl) propane, etc. A preferred diol is bisphenol A.

A widely used class of diepoxides which are useful according to the present invention includes the resinous epoxy polyethers obtained by reacting an epihalohydrin, such as epichorohydrin, and the like, with either a dihydric phenol or a dihydric alcohol. Typically the epoxy resins have an average of at least 1.8 reactive, 1,2-epoxy groups per molecule. An illustrative, but by no means exhaustive, listing of suitable dihydric phenols includes 4,4'-isopropylidene bisphenol, 2,4'-dihydroxydiphenylethylmethane, 3-3'-dihydroxydiphenyldiethylmethane, 3,4'-dihydroxydiphenylmethylpropylmethane, 2,3'-dihydroxydiphenylethylphenylmethane, 4,4'-dihydroxydiphenylpropylphenylmethane, 4,4-dihydroxydiphenylbutylphenylmethane, 2,2'-dihydroxydiphenylditolylmethane, 4,4'-dihydroxydiphenyltolylmethylmethane and the like. Other polyhydric phenols which may also be co-reacted with an epihalohydrin to provide these epoxy polyethers are such compounds as resorcinol, hydroquinone, substituted hydroquinones, e.g., methylhydroquinone, and the like.

It will be appreciated by those skilled in the art that the diepoxide compositions which are useful according to the practice of the present invention are not limited to those containing the above described diepoxides, but that these diepoxides are to be considered merely as being representative of the class of diepoxides as a whole.

The diepoxide is modified by partially reacting it with a polyoxyalkyleneamine of molecular weight of about 900 to about 2500. That is, with from about 5 wt% to about 60 wt% and preferably about 5 wt% to about 40 wt% of the polyoxyalkyleneamine. The polyoxyalkyleneamine is preferably a block copolymer of ethylene oxide and propylene oxide terminated with primary amino groups and is preferably a monoamine or diamine. The polyoxyalkyleneamine may be a polyoxyethyleneamine, but as shown in Example V polyoxypropyleneamine modified resins do not produce water reducible systems.

In one embodiment the polyoxyalkyleneamine is a polyoxyalkylene diamine. A group of polyoxyalkylene diamines have been found that demonstrates beneficial properties which is characterized by the general formula:

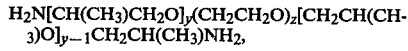

wherein y ranges from 1 to 5 and z ranges from 5 to 50 and preferably 15 to 35. This group of polyoxyalkylene diamines has a molecular weight of from about 900 to about 2500 and preferably about 1000 to about 2500. This group of diamines is derived from oxyethylene groups (—CH$_2$CH$_2$O—) and oxypropylene groups [—OCH$_2$CH(CH$_3$)—]. Diamines of this type are marketed by Texaco Chemical Co., Inc. under the trademark JEFFAMINE[3] ED-series.

Another group of polyoxyalkyleneamines is one of polyoxyalkylene monoamines. A group of polyoxyalkylene monoamines has been found that demonstrates beneficial properties and which is characterized by the general formula:

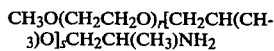

wherein r ranges from about 16 to about 25 and s ranges from about 0 to about 5.

This group of polyoxyalkylene monoamines has a molecular weight of from 900 to 1100.

This group of monoamines is also a block copolymer of oxyethylene groups (—CH$_2$CH$_2$O—) and oxypropylene groups [—OCH$_2$CH(CH$_3$)—].

Monoamines of this type are marketed by Texaco Chemical Co., Inc. under the trademark JEFFAMINE[3] M-series.

It has been found that polyoxyalkyleneamines of molecular weight from about 900 to about 2500 produce a group of emulsifiable, water borne epoxy resins demonstrating superior qualities for an adhesive.

Polyoxyalkyleneamines of molecular weight less than about 900 produce epoxy resin systems which do not emulsify in aqueous media and separate into two phases regardless of degree of ethoxylation. In Example IV is shown polyoxyethyleneamines of molecular weight less than 900 which produce incompatible mixtures that are completely unsuitable as adhesives.

The polyoxyalkyleneamine moiety modifying the polyepoxide emulsifies the epoxy resin system. It is theorized that modified epoxy resin solubility in aqueous media is caused by the polyoxyethylene in the polyoxyalkyleneamine used to modify the base resin. Increasing weight percents of ethylene oxide in the base resin achieve increasing solubility with about 5 wt% of polyoxyalkyleneamine being minimum for solubility. It has been found that less than 5 wt% of a polyoxyalkyleneamine is not an absolute cutoff point, but that emulsification is reduced and the material is less satisfactory as a water borne adhesive.

Increasing amounts of polyoxyalkyleneamine enhance solubility. The limiting factor in degree of modification is adhesive bond strength. It has been found that the adhesive is softer at higher degrees of modification with 60 wt% polyoxyalkyleneamine being the limit for adequate adhesive strength for ordinary applications.

At higher degrees of modification, of about 40 wt% to about 60 wt%, a flexible bond is produced with a high peel strength, but with a lower tensile shear strength. Correspondingly lower amounts of polyoxyalkyleneamine produce adhesives with a greater tensile shear strength but with reduced flexibility. A preferred degree of modification of about 5 wt% to about 40% of polyoxyalkyleneamine which has been found to produce a good water borne adhesive that produces a strong adhesive bond as seen in the Examples.

One beneficial property of the present invention is that the emulsifier used in the epoxy resin system of the present invention is incorporated into the adhesive compound, specifically into the base resin. During the curing of the resin system, the emulsifier becomes a part of the cured resin. This differs from many water reduced epoxy systems found in the prior art that utilize emulsifiers which become incompatible during the curing phase. Such incompatible emulsifiers tend to be forced to the surface of the substrate during curing where they concentrate thus weakening the adhesive bond.

Part B of the two part composition of the present invention comprises a reactive water compatible latent curative agent.

Latent curatives are agents that, when combined with an epoxy resin, provide an extended pot life (to six months or longer) with little or no reaction taking place. Among products commonly used for this purpose are boron trifluoride-amine complexes, amine salts and certain solid materials which may be finely dispersed into the epoxy resin system where they remain unreacted until the temperature of the system is raised to a point sufficient to melt the solid curative and promote curing. Such a material is dicyandiamide (DICY; cyanoguanidine). This is the curative of choice for the water reduced systems of the present invention since experience has shown that dicyandiamide is not degraded upon exposure to the water present in the adhesive system. Other latent curatives commonly used, i.e., amine salts boron trifluoride-amine complexes would not be useful in water based systems since they would be ionized or decomposed in such an environment.

In the formulation of the epoxy system, the modified polyepoxide and water are mixed to form a compatible solution. A curing amount of curative agent is added and the mixture is stirred until homogeneous. At this point, a water soluble solvent such as isopropanol may be added to adjust the viscosity of the mixture. The mixture thereby produced is a stable emulsion which may be stored for prolonged periods prior to use.

The curing agent is admixed with the modified polyepoxide composition in amounts according to the functional equivalent weight of the curing agent employed. Generally the number of equivalents of reactive groups is from about 0.8 to about 1.2 times the number of epoxide equivalents present in the curable epoxy resin composition, with from 0.9 to a stoichiometric amount being preferred. The exact amount of curative agent which constitutes a curing amount will depend primarily on the application for which the cured resin is intended. The curing amount to be used in a particular formulation can be found without excessive testing by a technician trained in the art. A curing amount of curative agent is the quantity which maximizes a desired physical property. Typically the property maximized is either the glass transition point (Tg) or heat deflection temperature (HDT).

The use of a water soluble solvent is entirely optional and serves only to meet the viscosity requirements of the individual adhesive application. In the Examples is shown the use of isopropanol but any volatile water soluble organic solvent which does not react with the epoxy resin system or color or otherwise impair the adhesive properties is suitable. Isopropanol satisfies all of these requirements and its use is known in the art.

It has been found that epoxy resins modified by partial reaction with a polyoxyalkylene monoamine have rather low viscosities. The reaction of the modified epoxy resin with additional polyoxyalkylene monoamine either results in no viscosity change or a slight lowering of viscosity. Typically the viscosity of this group of epoxy resins can be adjusted with water alone.

In the case of epoxy resins modified with polyoxyalkylene diamines it has been found that system viscosity increases to a high degree with increasing modification. These systems become difficult to work with in practice without the addition of water and optionally a suitable solvent such as isopropanol to decrease viscosity.

Water and optionally isopropanol are added to control viscosity in such amounts as can immediately be determined by a technician skilled in the art. Water and isopropanol, of course, leave the system during the curing process.

The one component epoxy system exists as a quiescent, homogenous emulsion of the individual components, parts A and B, until applied to a surface in a thin layer and subjected to a cure at elevated temperature.

The curing temperature range acceptable in this invention is from about 120° C. to about 180° C. for about 1 to 3 hours. Preferably curing is done at about 150° C. for 1 to 2 hours.

EXAMPLE Ia

Preparation of Modified Epoxy Resin

Reactants

| | |
|---|---|
| Liquid epoxy resin (WPE 185)[1] | 100 pbw. |
| JEFFAMINE ® ED-2001[2] | 10 pbw. |

The epoxy resin was heated to 125° C. while stirring under a nitrogen purge. The amine was added rapidly. After addition was completed, the reaction temperature was maintained for one hour. The product was cooled and packaged. Properties of product were:

| | |
|---|---|
| Brookfield viscosity, cps., 25° C. | 19700 |
| Total amine, meq./g. | 0.07 |
| Epoxide content, meq./g. | 4.78 |
| Weight per epoxide (WPE) | 209 |

[1]weight per epoxide (WPE)
[2]JEFFAMINES ® are polyoxyalkyleneamines with approximate molecular weights corresponding to the number following. Products of Texaco Chemical Company, Inc., Houston, Texas.
Structure of ED-2001:
$O[(-CH_2CH_2O-)_{20.9}(-CH_2CH(CH_3)O-)_{0.75}(-CH_2CH(CH_3)NH_2)]_2$
% $(-_{OCH_2}CH_2-)$ = 89 wt % approx.

EXAMPLE Ib

Preparation of Other Adducts
Other adducts were made as follows by the method of Example Ia.
Formulations and compositions are as follows:

| | A | B | C | D | E | F | G | H |
|---|---|---|---|---|---|---|---|---|
| Reactants | | | | | | | | |
| Liquid Epoxy resin (WPE 185) | 100 | 100 | 100 | 100 | 100 | 100 | 100 | 100 |
| JEFFAMINE ® ED-2001 | 5 | 20 | 40 | — | — | — | — | — |
| JEFFAMINE ® M-1000[1] | — | — | — | 5 | 10 | 20 | 40 | — |
| JEFFAMINE ® D-2000[2] | — | — | — | — | — | — | — | 40 |
| Properties of Product | | | | | | | | |
| Brookfield viscosity, cps., 25° C. | 17900 | 24000 | 31000 | 11600 | 11300 | 10200 | 8750 | 69300 |
| Total amine content, meq./g. | 0.07 | 0.09 | 0.16 | 0.04 | 0.08 | 0.15 | 0.24 | 0.27 |
| Epoxide content, meq/g. | 5.03 | 4.51 | 3.58 | 5.07 | 4.79 | 4.34 | 3.60 | 3.56 |
| Weight per epoxide | 199 | 221 | 279 | 197 | 209 | 230 | 278 | 281 |

[1]M-1000 Structure:
$CH_3O(CH_2CH_2O)_{18.6}[CH_2CH(CH_3)O]_{1.6}CH_2CH(CH_3)NH_2$
% $(-_{OCH_2}CH_2-)$ = 82 wt % approx.
[2]D-2000 Structure:
$H_2NCH(CH_3)CH_2[-OCH_2CH(CH_3)-]_{33.1}NH_2$
% $(-_{OCH_2}CH_2-)$ = 0%

EXAMPLE II

Water Reduced Adhesives Prepared From JEFFAMINE ® ED-2001 Modified Epoxy Resin

| Formulation | I | J | K | L |
|---|---|---|---|---|
| Epoxy resin ED-2001 Adduct | | | | |
| (100·5 pbw.; WPE 203) | 100 | — | — | — |
| (100·10 pbw.; WPE 209) | — | 100 | — | — |
| (100·20 pbw.; WPE 221) | — | — | 100 | — |
| (100·40 pbw.; WPE 279) | — | — | — | 100 |
| Dicyandiamide[1] | 11.8 | 11.5 | 10.9 | 8.6 |
| Water isopropanol mixture (4·1 pbw.) | 40 | 70 | 150 | 200 |
| Brookfield viscosity, cps @ 25° C. | | | | |
| initial | 1400 | 1900 | 2200 | 2150 |
| After: | | | | |
| 24 hrs @ 25° C. | 1750 | 2250 | 2050 | 2350 |
| 7 days 25° C. | 2200[4] | 2400[4] | 2700[4] | 2800[4] |
| Adhesive Properties:[2] | | | | |
| Tensile shear strength, psi. (ASTM D-1002) | 2500 | 2400 | 1600 | 1900 |
| T-peel strength, pli (ASTM D-1876) | 2.4 | 3.2 | 3.1 | 5.7 |
| Adhesive Properties:[3] | | | | |
| Tensile shear strength, psi. (ASTM, D-1002) | 2200 | 2200 | 2400 | 2800 |
| T-peel strength, pli (ASTM D-1876) | 3.4 | 4.0 | 3.2 | 5.9 |

[1]Cyanoguanidine (CG 1400, Omicron Chemical Co.) particle size 5 micron.
[2]Freshly formed emulsion applied to both aluminum surfaces. Allowed to remain open to air for four hours. Cured two hours at 150° C.
[3]Adhesive bond prepared from emulsions that were mixed and stored for seven days at 25° C. before use. Procedure for forming bond same as described in Footnote 2.
[4]Solids settled without phase separation; emulsion readily reformed with stirring.

EXAMPLE III

Water Reduced Adhesives Prepared From JEFFAMINE ® M-1000 Modified Epoxy Resin

| Formulation | M | N | O | P |
|---|---|---|---|---|
| Epoxy resin M-1000 Adduct | | | | |
| (100·5 pbw.; WPE 197) | 100 | — | — | — |
| (100·10 pbw.; WPE 209) | — | 100 | — | — |
| (100·20 pbw.; WPE 230) | — | — | 100 | — |
| (100.40 pbw.; WPE 278) | — | — | — | 100 |
| Dicyandiamide | 12.2 | 11.5 | 10.5 | 8.6 |
| Water | 50 | 50 | 65 | 100 |
| Brookfield viscosity, cps @ 25° C. | | | | |
| initial | 1200 | 1600 | 1850 | 2400 |
| After: | | | | |
| 24 hrs @ 25° C. | 2600 | 900 | 1600 | 2900 |
| 7 days 25° C. | 1000 | 1050 | 2200 | 4000 |
| Adhesive Properties:[1] | | | | |
| Tensile shear strength, psi. (ASTM D-1002) | 1900 | 3400 | 2500 | 2000 |

Water Reduced Adhesives Prepared From JEFFAMINE ® M-1000 Modified Epoxy Resin (continued)

| Formulation | M | N | O | P |
|---|---|---|---|---|
| T-peel strength, pli (ASTM D-1876) | 3.4 | 3.7 | 3.6 | 5.0 |
| Adhesive Properties:[2] | | | | |
| Tensile shear strength, psi. (ASTM, D-1002) | 2400 | 1900 | 3500 | 2700 |
| T-peel strength, pli (ASTM D-1876) | 3.1 | 3.5 | 3.4 | 3.2 |

[1]Freshly mixed adhesive formulation applied to both aluminum surfaces. Allowed to remain open to air for four hours. Cured two hours at 150° C.
[2]Adhesive bond prepared from emulsions that were mixed and stored for seven days at 25° C. before use. Procedure for forming bond same as described in Footnote 1.

EXAMPLE IV

Water Incompatible Systems From Modified and Unmodified Epoxy Resins

| Formulation | Q | R | S | T | U | V | W |
|---|---|---|---|---|---|---|---|
| Liquid epoxy resin (WPE 185) | 100 | — | — | — | — | — | — |
| Epoxy resin ED-600[2] Adduct | | | | | | | |
| (100·10 pbw.; WPE 222) | — | 100 | — | — | — | — | — |
| (100·30 pbw.; WPE 376) | — | — | 100 | — | — | — | — |
| Epoxy resin M-360[3] Adduct | | | | | | | |
| (100·40 pbw.; WPE 332) | — | — | — | 100 | — | — | — |
| (100·5 pbw.; WPE 376) | — | — | — | — | 100 | — | — |
| (100·60 pbw.; WPE 433) | — | — | — | — | — | 100 | — |
| Epoxy resin M-600[4] Adduct | | | | | | | |
| (100·50 pbw.; WPE 342) | — | — | — | — | — | — | 100 |
| Dicyandiamide | 13.0 | 4.6 | 2.7 | 3.1 | 2.8 | 2.4 | 3.0 |
| Dimethylbenzylamine | — | 0.4 | 0.2 | 0.2 | 0.2 | 0.2 | 0.2 |
| Water-isopropyl alcohol mixt. (4·1 pbw.) | 40 | 60 | 60 | 60 | 60 | 60 | 60 |
| Brookfield viscosity, cps. @ 25° C. | 5 | 5 | 5 | 5 | 5 | 5 | 5 |

[1]Unmodified epoxy resin
[2]Structure O[(CH$_2$CH$_2$O)$_{4.35}$(CH$_2$CH(CH$_3$)O)$_{0.75}$(CH$_2$CH(CH$_3$)NH$_2$)]$_2$
% (OCH$_2$CH$_2$) = 64 wt %
[3]Structure: n-C$_4$H$_9$(OCH$_2$CH$_2$)$_4$OCH$_2$CH(CH$_3$)OCH$_2$CH(CH$_3$)NH$_2$
% (OCH$_2$CH$_2$) = 48 wt %
[4]Structure: CH$_3$OCH$_2$CH$_2$O[CH$_2$CH(CH$_3$)O]$_8$CH$_2$CH(CH$_3$)NH$_2$
% (OCH$_2$CH$_2$) = 7.4 wt %
[5]Incompatible mixture; separated into two phases immediately after stirring.

EXAMPLE V

Water Incompatible Systems From JEFFAMINE ® D-2000 Modified Epoxy Resins

| Formulation | X | Y | Z |
|---|---|---|---|
| Epoxy resin D-2000 adduct[1] | | | |
| (100·10 pbw; WPE 208) | 100 | — | — |
| (100·20 pbw; WPE 230) | — | 100 | — |
| (100·40 pbw; WPE 281) | — | — | 100 |
| Dicyandiamide | 11.6 | 10.5 | 8.6 |
| Water | 70 | 100 | 80 |
| Brookfield viscosity, cps. 25° C. | 2 | 3 | 3 |

[1]JEFFAMINE ® D-2000 structure
H$_2$NCH(CH$_3$)CH$_2$[—OCH$_2$CH(CH$_3$)—]$_{33.1}$NH$_2$
% (—OCH$_2$CH$_2$—) = 0%
[2]Incompatible blend; viscosity with 60 g. water 50000 cps. separated upon addition of 10 g. additional water.
[3]Incompatible blend The principle of the invention and the best mode contemplated for applying the principle have been described. It is to be understood that the foregoing is illustrative only and that other means and techniques can be employed without departing from the true scope of the invention defined in the following claims.

What is claimed is:

1. An epoxy resin composition comprising:
   (A) a diepoxide comprising the condensation product of
      (a) epichlorohydrin with
      (b) an aromatic or aliphatic diol,
   which diepoxide is partially reacted with a polyoxyalkyleneamine of molecular weight of about 900 to about 2500; and
   (B) a latent curative agent in an aqueous medium.

2. The composition of claim 1 wherein the diol is bisphenol A.

3. The composition of claim 1 wherein the diepoxide has been reacted with from 5 wt% to 60 wt% of the polyoxyalkyleneamine.

4. The composition of claim 1 wherein the diepoxide has been reacted with from 5 wt% to 40% of the polyoxyalkyleneamine.

5. The composition of claim 1 wherein the polyoxyalkyleneamine is a block copolymer of ethylene oxide and propylene oxide terminated with primary amino groups.

6. The composition of claim 5 wherein the polyoxyalkyleneamine is a diamine.

7. The composition of claim 5 wherein the polyoxyalkyleneamine is a monoamine.

8. The composition of claim 1 wherein in the polyoxyalkyleneamine is of the general formula:

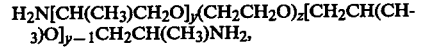

wherein y ranges from 1 to 5 and z ranges from 5 to 50.

9. The composition of claim 8 wherein z ranges from 15 to 35.

10. The composition of claim 1 wherein the polyoxyalkyleneamine is of the general formula:

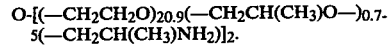

11. The composition of claim 1 wherein the polyoxyalkyleneamine is of the general formula:

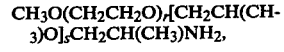

wherein r ranges from 16 to 25 and s ranges from 0 to 5.

12. The composition of claim 1 wherein in the polyoxyalkyleneamine is of the formula:

$$CH_3O(CH_2CH_2O)_{18.6}[CH_2CH(CH_3O)]_{1.6}CH_2CH(CH_3)NH_2.$$

13. The composition of claim 1 wherein the latent curative agent is dicyandiamide.

* * * * *